June 12, 1923.
M. O. CARLSON
PUSH SLED
Filed May 6, 1921
1,458,392
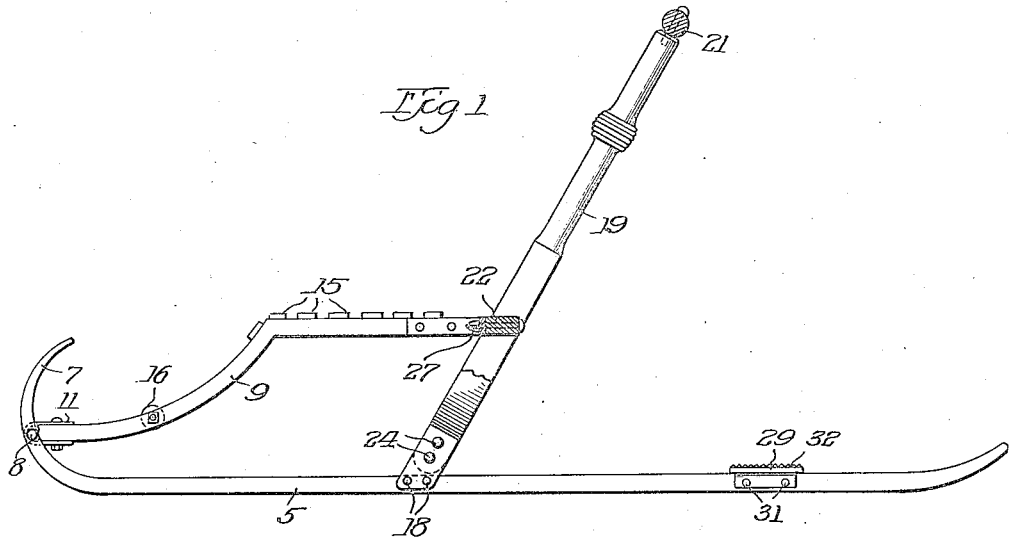
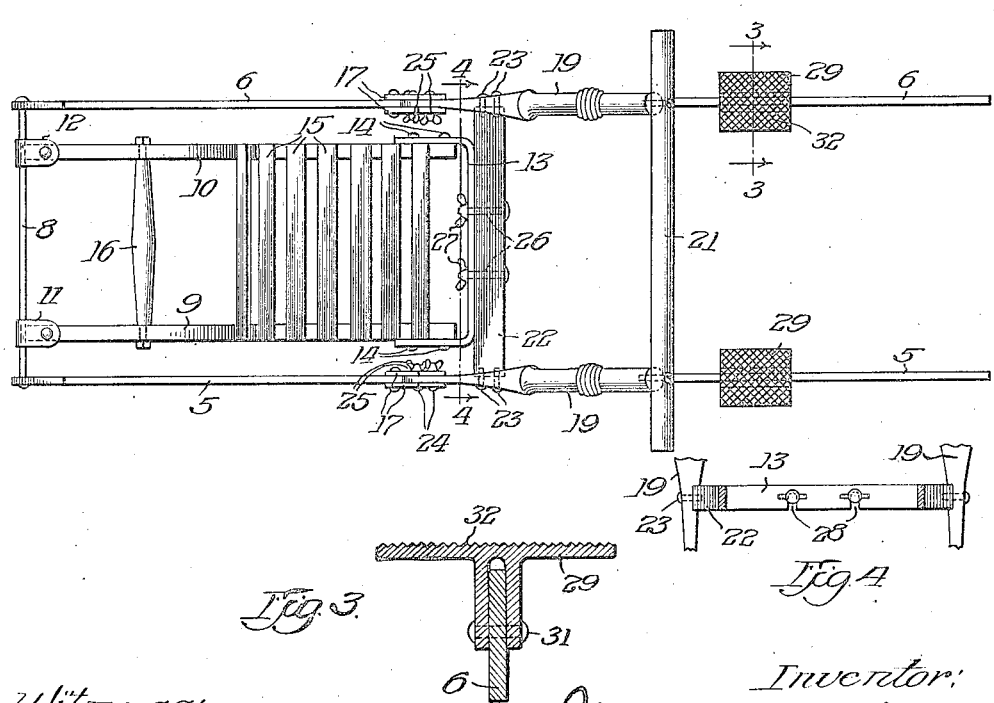

Patented June 12, 1923.

1,458,392

UNITED STATES PATENT OFFICE.

MARTIN O. CARLSON, OF CHICAGO, ILLINOIS.

PUSH SLED.

Application filed May 6, 1921. Serial No. 467,399.

*To all whom it may concern:*

Be it known that I, MARTIN O. CARLSON, a citizen of the United States, residing at Chicago, in the county of Cook and State of Illinois, have invented new and useful Improvements in Push Sleds, of which the following is a specification.

This invention relates in general to sleds, and has more particular reference to a light sled adapted for use more particularly by children.

One of the primary purposes of this invention is to provide a sled which shall be so constructed that it may be propelled by one foot of the rider without causing the sled to swerve sidewise or be diverted from its course by the pushing action.

Another object of the invention is to provide a sled upon which the rider may stand on one foot, thus leaving the other foot free to propel the sled at a rapid speed, the sled being equipped with a steering device by which the direction of travel may be controlled, this steering device also serving as a handle to which the rider may cling while standing in upright position on one of the sled runners.

A further object of the invention is to provide a push sled of the character indicated which shall be so constructed that two riders may stand in upright position and both contribute toward the propulsion of the sled without interference with each other, and furthermore, the sled is designed to provide a seat on which one or more riders may be carried as the sled is propelled by those standing behind it.

A further object is to provide a sled which can be collapsed for shipment and for purposes of transportation so that it can be readily carried by the user on street cars or other vehicles without occupying much space.

Other objects are to provide a sled which will be strong and durable in construction, economical to manufacture, one which will be light and which can be easily steered and readily propelled with a minimum of exertion, and which will be capable of attaining high speeds.

Other objects and many of the inherent advantages of this invention should be readily appreciated as the same becomes better understood, by reference to the following description, when considered in connection with the accompanying drawings.

Referring to the drawings:

Fig. 1 is a side elevation of a sled embodying my invention;

Fig. 2 is a plan view thereof;

Figs. 3 and 4 are fragmentary sectional views on the lines 3—3 and 4—4 respectively of Fig. 1.

By reference to the drawings, it will be observed that my sled comprises two longitudinally extending parallel runners, indicated by reference characters 5 and 6 respectively.

These runners may be of any desired length and cross-sectional shape, but preferably, they are relatively high and narrow, as will be apparent from Fig. 3.

The forward ends of the runners are curved upwardly, as indicated at 7 and connected by a cross rod 8 of any preferred type, which may be riveted or bolted to hold the runners in the requisite and spaced relation. Upon this rod there is pivotally mounted the forward end of a seat frame, which comprises the side members 9 and 10 pivoted to the rod 8 by clips 11 and 12, the rear ends of these side members being connected by a metal yoke 13 overlapping the rear ends of the side members and secured thereto by rivets or screws 14, and extending transversely between the side members are a series of seat slats 15 upon which one or more passengers may sit. Preferably, a spacing bar 16 is disposed between the side members forwardly of the slats to maintain the side members in spaced relation, and to afford a foot rest for the passengers.

Each runner is equipped intermediate its ends with a pair of upwardly extending ears 17, which are rigidly secured to the runners by rivets 18 or otherwise, these ears being disposed in spaced relation, as will be apparent from Fig. 2, to accommodate therebetween the lower ends of the upright bars 19 of the steering device. These uprights are connected at their extremity by a cross bar 21, and are also securely connected between their ends by a transverse bar 22 rigidly attached to the uprights by screws 23. The lower ends of the uprights 19 are connected to the ears 17 by a plurality of bolts 24 equipped at their inner ends with wing nuts 25, by which the uprights are rigidly clamped in position between the ears. The transverse bar 22 is provided with a plurality of bolts 26 which project forwardly of the bar and are equipped at these projecting ends with wing nuts 27. These bolts are disposed in spaced relation, as shown, and the metal yoke 13 is provided with similarly spaced slots 28 adapted to fit down over the projecting ends of the bolts, whereupon by tightening the wing nuts, the yoke 13 is rigidly clamped to the transverse bar 22.

Rearwardly of the steering device, each runner is preferably equipped with a foot rest 29 secured to the runner by rivets 31, or otherwise, the upper face of each foot rest being corrugated or roughened, as indicated at 32 so that a rider may stand thereon without danger of slipping off. These foot rests may be of any desired construction and formed integrally with or attached to the runners, as preferred, and in some instances, it may be preferable to omit them entirely, in which case the rider would stand directly upon the top of the runner.

It will be observed that the space between the runners rearwardly of the steering device is entirely unobstructed so that one or more riders standing on the runners may push between the runners with their inside foot, thus propelling the sled without causing it to swerve or be diverted from its course, as would be the case where the propelling foot was at one side of the sled. In the use of the sled, one or more passengers may sit on the slatted seat, while one or more may stand behind on the runners, grasping the cross bar 21 of the steering device with their hands and using their inside foot between the runners to propel the sled. By twisting movement exerted upon the steering device, the runners may be slightly tilted so as to cause the sled to be diverted either to the right or left, as may be desired, thereby enabling the sled to be steered by the rider or riders standing on the runners.

The sled is capable of being knocked down for transportation, or to be carried about from place to place, and this result is accomplished in the following manner: By unscrewing the thumb nut and withdrawing either the upper or lower bolt 24 at each side of the steering device, the steering device may be swung upon the other bolt 24 at each side downwardly into substantially parallel relation with the runners. In order to free the steering device from the seat frame so that it may be swung down into collapsed position, it is only necessary to loosen the thumb nuts 27 on the bolts 26, whereupon the rear end of the seat frame can be raised to clear the slots 28 from the bolts 26, thus disconnecting the seat frame from the steering device. When the steering device has been swung down to collapsed position, the rear end of the seat frame may also be dropped into substantially parallel relation with the runners so that the whole sled is collapsed and may be readily carried, or can be shipped, and in either case, will occupy a minimum amount of space.

It will be apparent from the foregoing that I have provided a sled which is capable of carrying three or more passengers, one which will enable one or more to propel the sled by pushing between the runners, one which enables the propelling rider to stand upright and steer the sled through the steering device, and one which can be economically manufactured, readily assembled, and easily collapsed when desired.

While I have shown and described a preferred embodiment of the invention, obviously, the details of construction are capable of wide modification and variation without departing from the essence of the invention, as set forth in the following claim.

I claim:

A push sled comprising a pair of runners connected at their front ends, steering handles rising from the runners, a cross-bar connecting the handles, a seat pivotally associated with the front of the runners, a yoke embracing the rear end of the seat and provided in its under edge with notches, and headed projections on the cross-bar adapted to be detachably received in the notches of the yoke.

MARTIN O. CARLSON.